July 21, 1931. L. D. ALBERTSON 1,815,817
GRASS TRIMMER
Filed July 17, 1929
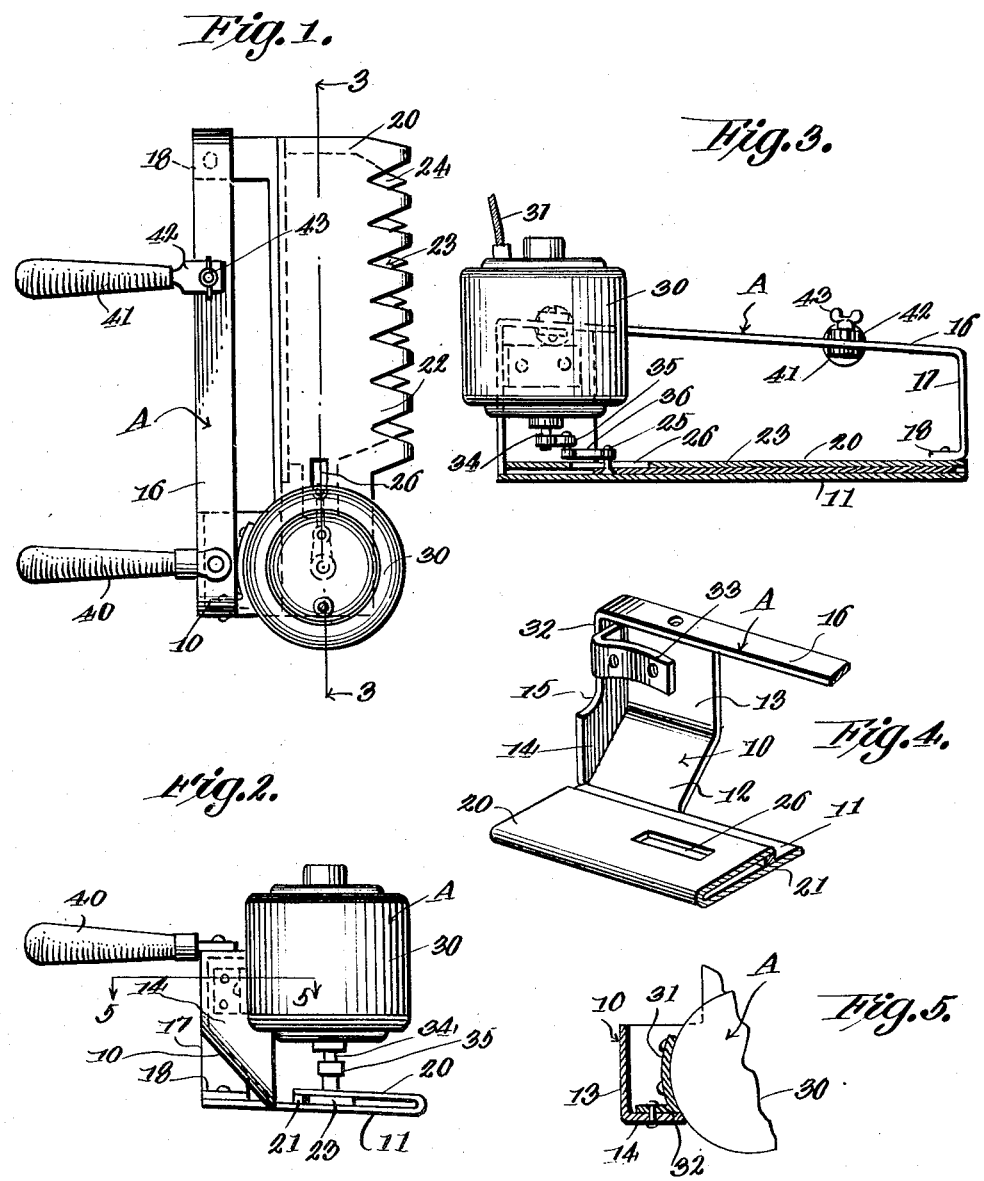
Inventor
LUTHER D. ALBERTSON
By Irving L. Watterson
Attorney Patented July 21, 1931

1,815,817

UNITED STATES PATENT OFFICE

LUTHER D. ALBERTSON, OF CORYDON, INDIANA, ASSIGNOR OF ONE-FOURTH TO JOHN W. DAVIDSON, ONE-FOURTH TO EMMETT BEANBLOSSOM, ONE-FOURTH TO ALBERT STOVER, ONE-SIXTEENTH TO GEORGE C. SIMLER, THREE THIRTY-SECONDS TO OLIVER W. HOTTEL, AND THREE THIRTY-SECONDS TO CECIL W. MILES, ALL OF CORYDON, INDIANA

GRASS TRIMMER

Application filed July 17, 1929. Serial No. 378,987.

This invention appertains to portable electrically operated hedge and lawn border trimmers and has for one of its primary objects to provide a device of this character embodying a minimum number of parts, which are compactly arranged and which will present an exceedingly strong and sturdy structure.

Another object of my invention is to provide a hedge and lawn trimmer embodying a novel frame for supporting the various operating parts of the device and the electric motor for operating said parts.

A further object of my invention is to provide novel means for mounting the guide handles on the frame, whereby the device can be readily manipulated, one of the handles being adjustable on the frame toward and away from the other handle.

A still further object of my invention is to provide an improved electrically operated hedge and lawn border trimmer of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a top plan view of my improved device;

Figure 2 is an end elevation of the same;

Figure 3 is a longitudinal section through my improved device taken on the line 3—3 of Figure 1 looking in the direction of the arrows;

Figure 4 is an enlarged fragmentary perspective view of my novel frame;

Figure 5 is a detail section taken on the line 5—5 of Figure 2 looking in the direction of the arrows illustrating the means employed for supporting the electric motor on the frame.

Referring to the drawings in detail, wherein similar reference characters designate corresponding parts throughout the several views, the letter A generally indicates my improved hedge and lawn border trimmer which comprises a novel frame 10, which can be formed from sheet metal if so desired.

The frame 10 embodies a flat elongated bottom plate 11 forming a part of the cutter guard and the rear edge of this plate 11 adjacent to one end thereof is provided with a rearwardly and upwardly inclined back plate or wall 12 terminating in the vertical plate or rear wall 13. The outer side edges of the plates or walls 12 and 13 are connected together by a forwardly and laterally extending side wall or plate 14 having a notch 15 formed in its front edge. The upper edge of the side wall 14 has formed thereon an upper longitudinally extending brace bar 16 which is arranged above the bottom plate 11 of the cutter guard. This brace strap 16 terminates at the outer edge of and above the cutter guard and is provided with a depending arm 17 having an inwardly directed foot 18 formed thereon which can be riveted or otherwise secured to the cutter guard adjacent to the rear edge thereof.

By this construction, so far, it can be seen that an exceedingly light, but yet rigid frame is provided and which can be stamped from a single sheet of metal.

The front edge of the bottom cutter guard plate 11 has connected therewith a rearwardly extending top plate 20 which is arranged in spaced parallel relation to the bottom plate 11. It is to be noted that the metal from which the cutter guard is formed can be bent back upon itself on a longitudinal line to provide the upper and lower guard plates 20 and 11. The rear edge of the top guard plate 20 is held in spaced relation to the bottom guard plate 11 by means of a spacing and guide strip 21, for a purpose which will later appear.

The plates 11 and 20 at their front edges and at their point of connection are notched in a V form to provide a plurality of equidistantly spaced cutter guard teeth 22, as can be clearly seen by referring to Figure 1 of the drawings.

Reciprocably mounted between the upper and lower plates 20 and 11 and between the point of connection of said plates and the combined spacing and guide strip 21 is the reciprocating cutter bar 23 and the front edge of this bar is provided with a plurality of substantially V-shaped cutter teeth 24. The inner end of the cutter bar 23 carries an upstanding pin 25, which protrudes through a longitudinally extending slot 26 formed in the upper cutter guard plate 20.

I preferably provide an electric motor 30 for bringing about the rapid and easy reciprocation of the cutter bar 23 and the casing of the motor 30 is received in the notch 15 as clearly shown in Figure 2 of the drawings. A bracket 31 preferably formed from resilient metal is provided for securing the motor in place and this bracket includes the attaching foot 32 which can be riveted or otherwise secured to the side wall 14 of the frame and the arcuate supporting arm 33 to which can be secured the motor casing.

The armature shaft 34 of the motor 30 extends downwardly toward the cutter guard and has keyed or otherwise secured thereto a crank arm 35 to which is pivotally secured the pitman rod 36 which in turn is connected to the pin 25 carried by the cutter bar.

By this construction it can be seen that when the circuit is closed through the motor 30, the cutter bar will be rapidly reciprocated. The feed wires 37 for the motor 30 may be led to any suitable and convenient outlet.

In order to permit the convenient and effective use of the device, I provide a handle 40 and a handle 41. The handle 40 is bolted or otherwise secured to the upper surface of the brace bar 16 directly in rear of the motor 30, while the handle 41 is provided with a substantially U-shaped clamp portion 42 slidably mounted upon the brace bar 16. It is obvious that the handle 41 can be moved to any desired adjusted position along the length of the bar 16 and held in such position by the use of a thumb screw 43 carried by said clamp for impinging against the brace bar.

In operation of my improved device, the handles 40 and 41 are grasped by the user and the circuit is closed through the electric motor 30. The device is now moved over the border of the lawn to be trimmed, or the hedge, as the case may be.

Changes in details may be made without departing from the spirit or the scope of this invention, but

What I claim as new is:

1. A lawn and hedge trimmer comprising a rear wall and a side wall having a notch therein, a cutter guard carried by the lower edge of the rear wall, a brace bar carried by the upper edge of the rear and side walls and extending over in spaced relation to the cutter guard, means connecting the outer end of the brace bar to the cutter guard adjacent to the rear outer corner thereof, a cutter bar reciprocably mounted in said cutter guard, an electric motor fitted in said notch, a bracket connecting the motor to the side wall, means operatively connecting the motor with the cutter bar, a manipulating handle connected with the brace bar.

2. A portable electrically operated lawn border trimmer and hedge trimmer comprising a frame including a rear wall and a side wall having a notch therein, a cutter guard carried by the front edge of the rear wall and projecting laterally therefrom, a brace bar formed on the upper edge of the rear and side walls and projecting laterally therefrom toward the outer end of the cutter guard, a depending arm formed on the brace bar, a foot formed on the arm and rigidly connected to the cutter guard adjacent to the rear outer corner thereof, a cutter bar reciprocably mounted in the cutter guard, a bracket rigidly secured to the side wall and having an arcuate supporting arm projecting laterally therefrom adjacent to said notch, an electric motor fitted in the notch and connected to said supporting arm, means operatively connecting the electric motor with the cutter bar, and a pair of manipulating handles secured to the brace bar.

3. A portable lawn border and hedge trimmer comprising a frame including a rear and a side wall, a cutter guard projecting laterally therefrom, a reciprocatory cutter bar, a brace bar carried by the side and rear wall and projecting laterally therefrom over the cutter guard, means connecting the outer end of the brace bar to the outer rear corner of the cutter guard, an electric motor secured to the side wall, means operatively connecting the motor to the cutter bar, a handle rigidly secured to the brace bar and projecting rearwardly therefrom directly in rear of said motor, and a second handle adjustable on said brace bar toward and away from the first handle.

In testimony whereof I affix my signature.

LUTHER D. ALBERTSON.